US007261546B1

(12) United States Patent
Willingham et al.

(10) Patent No.: US 7,261,546 B1
(45) Date of Patent: Aug. 28, 2007

(54) APPARATUS FOR SEVERING MOLD CHARGES IN A COMPRESSION MOLDING MACHINE

(75) Inventors: Wendell D. Willingham, Perrysburg, OH (US); Daniel L. Mattice, Columbia City, IN (US); David C. Thompson, Grabill, IN (US)

(73) Assignee: Owens-Illinois Closure Inc., Perrysburg, OH (US)

( * ) Notice: Subject to any disclaimer, the term of this patent is extended or adjusted under 35 U.S.C. 154(b) by 0 days.

(21) Appl. No.: 11/431,785

(22) Filed: May 10, 2006

(51) Int. Cl.
*B26D 5/08* (2006.01)

(52) U.S. Cl. ....................................... 425/311; 425/809

(58) Field of Classification Search ................ 425/311, 425/809, 331

See application file for complete search history.

(56) References Cited

U.S. PATENT DOCUMENTS 2,539,916 A 1/1951 Ludington et al.
3,360,827 A 1/1968 Aichele
3,453,691 A 7/1969 Groves
3,488,804 A 1/1970 Butcher
3,670,467 A 6/1972 Walker
3,827,843 A 8/1974 Blouch
4,080,136 A 3/1978 Peller
4,332,538 A 6/1982 Campbell
4,820,470 A 4/1989 Ferrero
5,370,519 A * 12/1994 Shapcott ..................... 425/310
5,587,186 A 12/1996 Voigt
5,811,044 A * 9/1998 Rote et al. .................. 264/148
5,866,177 A * 2/1999 Ingram ....................... 425/297

FOREIGN PATENT DOCUMENTS

GB 2166999 5/1986
JP 63051110 3/1988

* cited by examiner

*Primary Examiner*—Robert Davis
*Assistant Examiner*—Marissa W. Chaet

(57) ABSTRACT

An apparatus for severing mold charges of molten plastic exiting an orifice along an orifice axis includes a motor system that provides a rotary output around an axis offset from the orifice axis. A blade arm is eccentrically coupled to the rotary output of the motor system for motion in a plane at an angle to the orifice axis, preferably perpendicular to the orifice axis. A knife blade is coupled to the blade arm and disposed to oscillate in a closed path, preferably an elliptical path, that intersects the orifice axis so that the knife blade engages and severs molten plastic exiting the orifice along the orifice axis. A control arm preferably is pivotally coupled to the blade arm and to a point that is fixed with respect to the orifice axis to control motion of the blade arm and the knife blade. The motor system preferably is mounted on a base, and has an output shaft that extends through the base and a hub coupled to the output shaft. The blade arm is pivotally coupled to the hub eccentrically of the shaft. The knife blade preferably has a cutting edge that is at an angle to the blade arm.

16 Claims, 4 Drawing Sheets

64 62 44 48 80 60 66 54 74 76 82 86 68 67 84 52 46 60

APPARATUS FOR SEVERING MOLD CHARGES IN A COMPRESSION MOLDING MACHINE

The present disclosure relates to a machine for compression molding plastic articles, such as closure shells or sealing liners within closure shells, and more particularly to an apparatus for severing mold charges for placement in the molds of the compression molding machine.

BACKGROUND AND SUMMARY OF THE DISCLOSURE

Machines for compression molding closure shells, or compression molding sealing liners within closure shells, typically include a turret or carousel that rotates around a vertical axis. A plurality of molds are provided around the periphery of the turret, in the form of male and female mold sections that are aligned along vertical axes parallel to the axis of turret rotation. Cams drive one or both of the mold sections of each pair between an open position, in which a molded part is stripped from the mold and a charge of molten plastic material is placed into the mold, and a closed position in which the mold sections are brought together to compression mold the shell or liner. In a liner machine, premade shells are placed in a nest when the mold sections are open, and a charge or pellet of liner material is placed within the mold before the mold is closed. U.S. patents that illustrate machines of this type for compression molding plastic closure shells include U.S. Pat. Nos. 5,670,110, 5,989,007, 6,074,583 and 6,478,568. U.S. patents that illustrate machines of this type for compression molding sealing liners within closure shells include U.S. Pat. No. 5,451,360. U.S. application Ser. No. 11/109,374 discloses a vertical wheel compression molding machine, which rotates around a horizontal axis, for compression molding closure shells or sealing liners within closure shells.

The present disclosure involves a number of aspects that can be implemented separately from or in combination with each other.

An apparatus for severing mold charges of molten plastic exiting an orifice along an orifice axis, in accordance with one aspect of the present disclosure, includes a motor system that provides a rotary output around an axis offset from the orifice axis. A blade arm is eccentrically coupled to the rotary output of the motor system for motion in a plane at an angle to the orifice axis, preferably perpendicular to the orifice axis. A knife blade is coupled to the blade arm and disposed to oscillate in a closed path, preferably an elliptical path, that intersects the orifice axis so that the knife blade engages and severs molten plastic exiting the orifice along the orifice axis. A control arm preferably is pivotally coupled to the blade arm and to a point that is fixed with respect to the orifice axis to control motion of the blade arm and the knife blade. The motor system preferably is mounted on a base, and has an output shaft that extends through the base and a hub coupled to the output shaft. The blade arm is pivotally coupled to the hub eccentrically of the shaft. The knife blade preferably has a cutting edge that is at an angle to the blade arm.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

The disclosure of U.S. application Ser. Nos. 11/109,374 and 11/156,115 are incorporated herein by reference.

Figure 1:
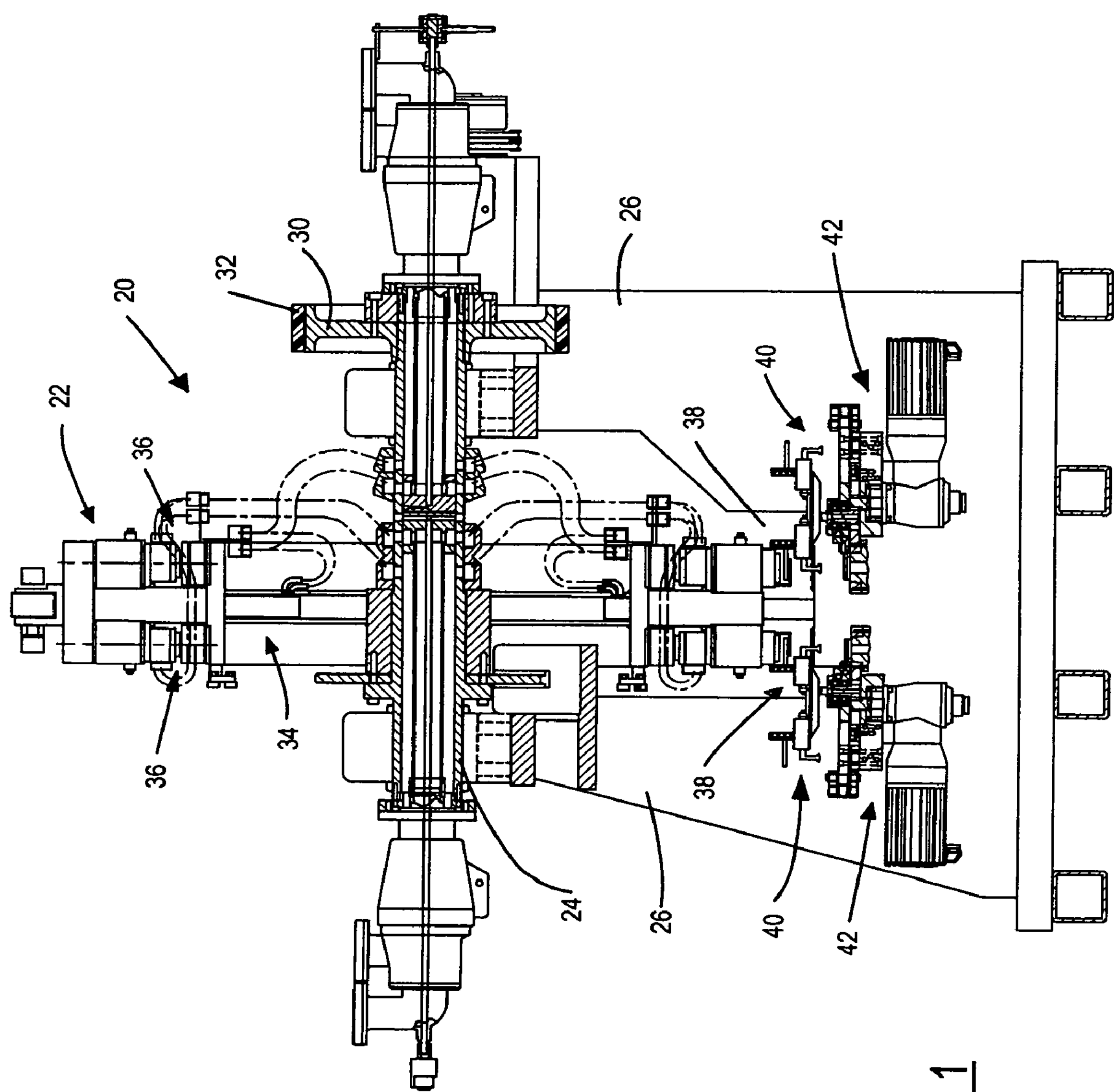
FIG. 1 is an elevational view of a compression molding machine in accordance with an exemplary implementation of the present disclosure.

FIG. 1 illustrates an exemplary machine 20 for compression molding plastic closure shells. Machine 20 includes a wheel 22 mounted on a shaft 24 between spaced supports 26. Shaft 24 is coupled by a pulley 30 and a belt 32 to a motor for rotating shaft 24 and wheel 22 around a horizontal axis. Wheel 22 includes a support 34 extending radially from shaft 24. Support 34 may comprise a disk or the like, or may be in the form of a plurality of angularly spaced spokes. A plurality of angularly spaced molds 36 are disposed around the periphery of wheel 22, preferably on both sides of the wheel. All of the molds 36 preferably are identical. An apparatus 38 is provided for removing molded parts from the compression molding machine, and an apparatus 40 is provided for placing mold charges into the molding machine. With molds 36 mounted on both sides of wheel 22 as is preferred, there will be a removal apparatus 38 on each side of the wheel and a placement apparatus 40 on each side of the wheel. Each placement apparatus 40 preferably includes an apparatus 42 for severing mold charges in accordance with the present disclosure.

Figure 2:
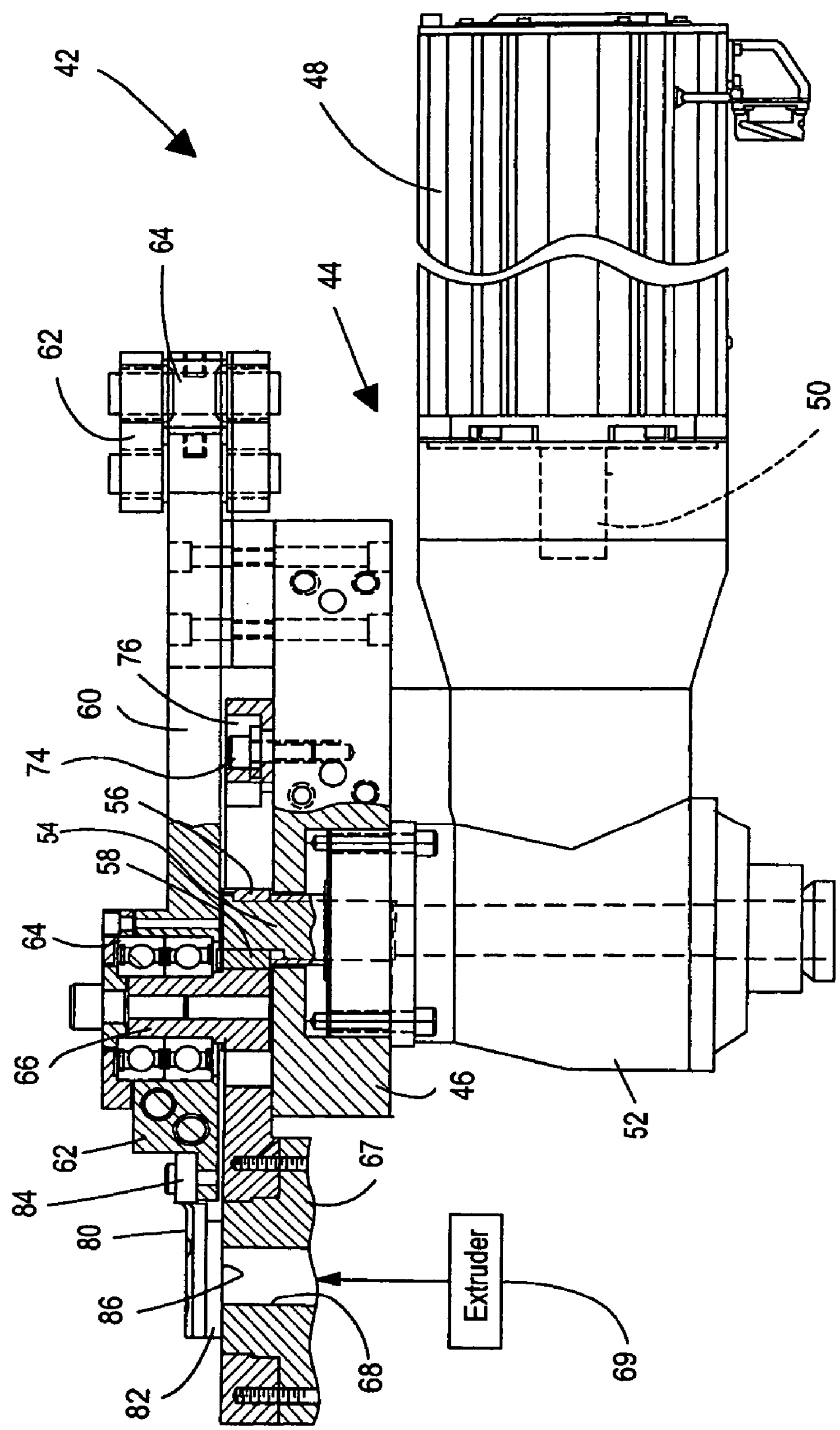
FIG. 2 is a front elevational view on an enlarged scale of an apparatus for severing mold charges of molten plastic in accordance with an exemplary embodiment of the disclosure in the molding machine of FIG. 1.
Figure 3:
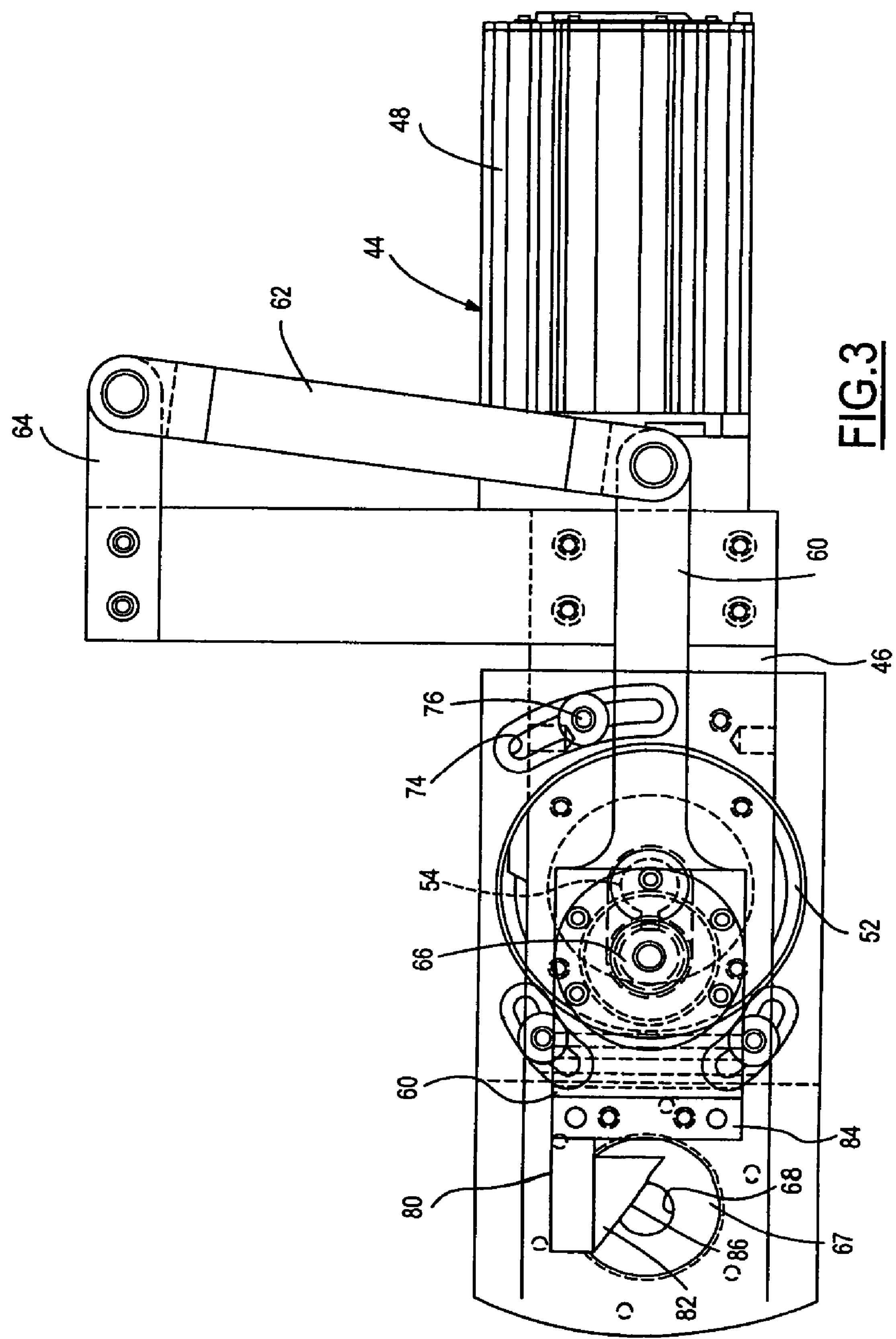
FIG. 3 is a top plan view of the apparatus illustrated in FIG. 2.
Figure 4:
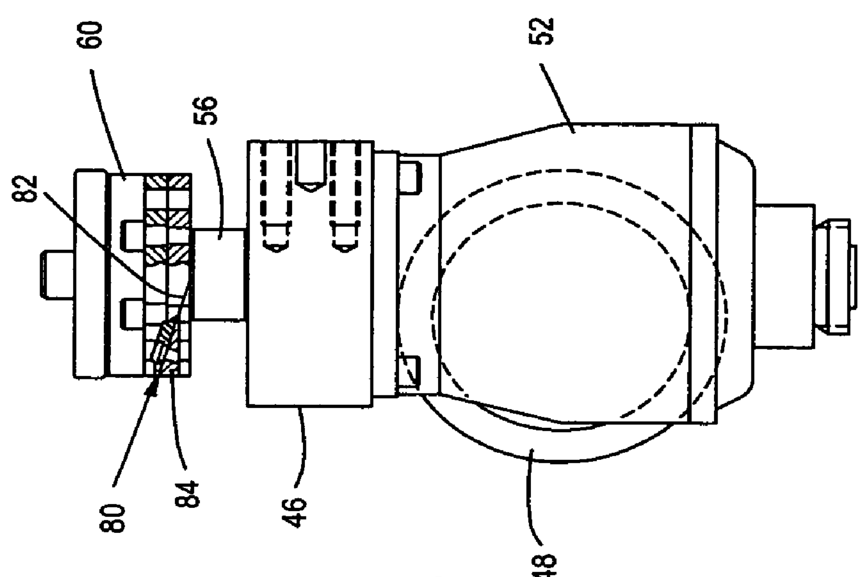
FIG. 4 is an end elevational view of the apparatus illustrated in FIGS. 2-3.

An exemplary embodiment of apparatus 42 is illustrated in greater detail in FIGS. 2-4, and includes a motor system 44 that preferably is suspended from a base 46. Motor system 44 preferably includes an electric servo motor 48 having a motor output shaft 50 coupled through a right-angle gear reducer 52 to a motor system output shaft 54 that extends through base 46. A hub 56 is coupled to shaft 54 above base 46, and a key 58 prevents rotation of hub 56 with respect to shaft 54. A blade arm 60 has a hub 62 coupled by bearings 64 to a shaft 66 that extends upwardly from hub 56. Shaft 66 of hub 56 is parallel to but eccentrically offset from the axis of shaft 54. An orifice plate 67 is coupled to support 46 and has an orifice 68 that receives a stream of molten plastic extrudate from an extruder 69. Orifice plate 67 preferably is stationarily mounted to base 46, and orifice 68 preferably has an orifice axis that is parallel to but offset from the axes of shafts 54, 66. Orifice 68 may be circular, as illustrated in FIG. 3, or of any other suitable geometry.

Blade arm 60 has an extension that overlies base 46. A control arm 62 preferably is pivotally connected at one end to blade arm 60 and at an opposing end to an arm 64 that is coupled to base 46. A knife 80 is mounted on the opposing end of blade arm 60. Knife 80 preferably includes a knife blade 82 mounted on an L-shaped blade support 84, which in turn is mounted, preferably replaceably mounted, on blade arm 60. The geometry of knife 80 may be such that the cutting edge 86 of blade 68 is at an angle to the axis of blade arm 60, preferably an outward angle as illustrated in FIG. 3.

This outward angle tends to push the severed pellet away from the blade arm, which facilitates pick-up by mechanism 40 (FIG. 1). Other cutting edge geometries can be employed, such as parallel to (e.g., collinear with) the axis of arm 60, curved or V-shaped. Cutting edge 86 preferably rides along the upper surface of orifice plate 67, as best seen in FIG. 2, to sever mold charges flushed with the surface of the orifice plate. Orifice plate 67 preferably is adjustably mounted on base 46 by means of arcuate slots 74 and fasteners 76. Knife blade 82 can be of any suitable material.

Figure 5:
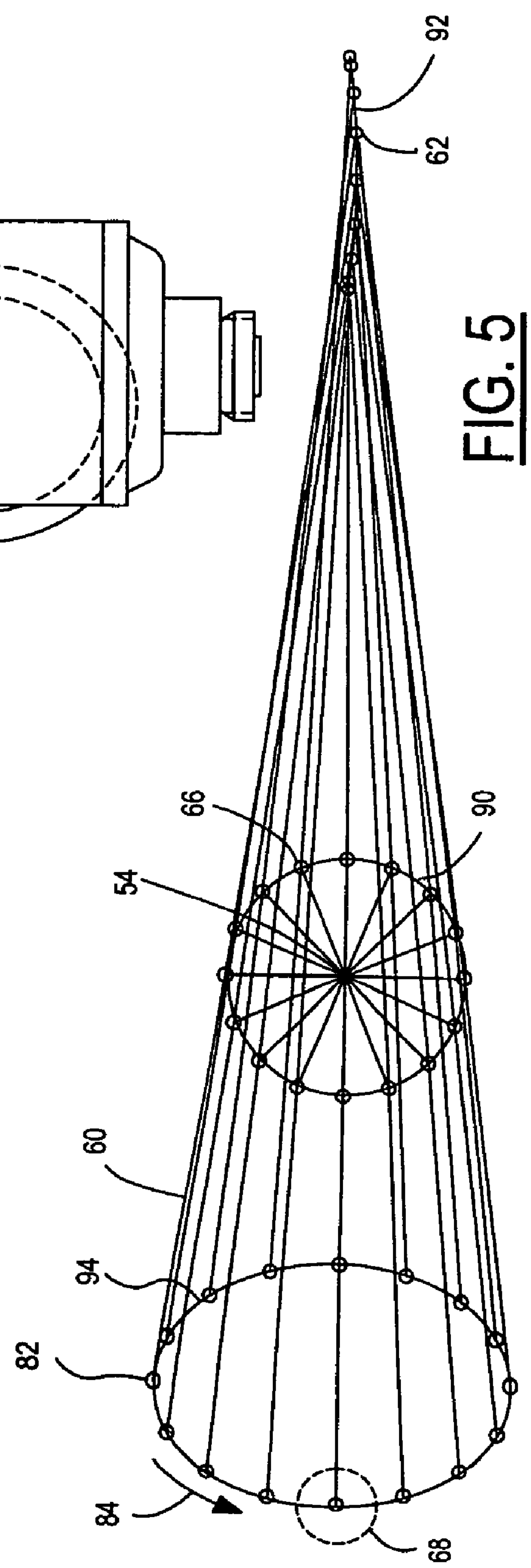
FIG. 5 is a schematic diagram that illustrates operation of the apparatus in FIGS. 2-4.

FIG. 5 is a schematic diagram that illustrates motion of blade arm 60 and knife blade 82. As hub shaft 66 orbits in a circular path 90 around the axis of motor system output shaft 54, the position of the pivotal connection between blade arm 60 and control arm 62 describes an arcuate path 92. Control arm forces knife blade 82 to travel in an elliptical path 94 that intersects orifice 68, preferably at a position spaced furthest from the axis of shaft 54. As the knife blade continues travel in the direction 96, the knife blade clears the extruder orifice, and the severed mold charge of molten plastic is picked up by placement apparatus 40 (FIG. 1) and placed within a mold 38, as described in greater detail in the above-referenced copending applications.

The disclosure has been presented in conjunction with an exemplary embodiment, and a number of modifications and variations have been discussed. Other modifications and variations readily will suggest themselves to persons of ordinary skill in the art in view of the foregoing discussion. For example, although the disclosure has been presented in conjunction with a horizontal axis vertical wheel compression molding machine, it will be apparent that the apparatus for severing mold charges of the present disclosure can be used equally as well in conjunction with vertical axis carousel-type machines for placing mold charges into the molds of the machine. The disclosure is intended to embrace all such modifications and variations as fall within the spirit and broad scope of the appended claims.

The invention claimed is:

1. Apparatus for severing mold charges of molten plastic exiting an orifice along an orifice axis, which includes:

a motor system that provides a rotary output around an axis offset from said orifice axis, a blade arm eccentrically coupled to said rotary output of said motor system for motion in a plane at an angle to said orifice axis, and a knife blade coupled to said blade arm and disposed to oscillate in a closed path that intersects said orifice axis so that said knife blade engages and severs molten plastic exiting said orifice along said orifice axis, and a control arm coupled to said blade arm and to a point that is fixed with respect to said orifice axis.

2. The apparatus set forth in claim 1 wherein said control arm is pivotally coupled to said blade arm and is pivotally coupled to said point that is fixed with respect to said orifice axis.

3. The apparatus set forth in claim 1 wherein said axis of said rotary output is parallel to said orifice axis.

4. The apparatus set forth in claim 1 wherein said plane is perpendicular to said orifice axis.

5. The apparatus set forth in claim 1 including a base, said motor system being mounted on said base.

6. The apparatus set forth in claim 5 wherein said motor system includes an output shaft and a hub coupled to said shaft, said blade arm being pivotally coupled to said hub eccentrically of said shaft.

7. The apparatus set forth in claim 1 wherein said closed path is elliptical.

8. Apparatus for severing mold charges of molten plastic exiting an orifice along an orifice axis, which includes:

a motor system that provides a rotary output around an axis offset from said orifice axis, a blade arm eccentrically coupled to said rotary output of said motor system for motion in a plane at an angle to said orifice axis, a knife blade coupled to said blade arm and disposed to oscillate in a closed path that intersects said orifice axis so that said knife blade engages and severs molten plastic exiting said orifice along said orifice axis, and a base, said motor system being mounted on said base, wherein said motor system includes an output shaft and a hub coupled to said shaft, said blade arm being pivotally coupled to said hub eccentrically of said shaft.

9. The apparatus set forth in claim 8 wherein said motor system includes a servo motor and a gear reducer coupling said servo motor to said output shaft.

10. Apparatus for severing mold charges of molten plastic exiting an orifice along an orifice axis, which includes:

a motor system that provides a rotary output around an axis offset from said orifice axis, a blade arm eccentrically coupled to said rotary output of said motor system for motion in a plane at an angle to said orifice axis, and a knife blade coupled to said blade arm and disposed to oscillate in a closed elliptical path that intersects said orifice axis so that said knife blade engages and severs molten plastic exiting said orifice along said orifice axis.

11. Apparatus for severing mold charges of molten plastic exiting an orifice along an orifice axis, which includes:

a motor system that provides a rotary output around an axis parallel to and offset from said orifice axis, a blade arm eccentrically coupled to said rotary output of said motor system for motion in a plane perpendicular to said orifice axis, a control arm pivotally coupled to said blade arm and to a point that is fixed with respect to said orifice axis, and a knife blade on said blade arm disposed to oscillate in a closed elliptical path that intersects said orifice axis so that said knife blade engages and severs molten plastic exiting said orifice along said axis.

12. The apparatus set forth in claim 11 wherein said knife blade has a cutting edge at an angle to said blade arm.

13. The apparatus set forth in claim 12 including a base, said motor system being mounted on one side of said base and said blade arm and said knife blade being disposed on an opposing side of said base from said motor system.

14. The apparatus set forth in claim 13 wherein said motor system includes an output shaft that extends through said base and a hub coupled to said shaft, said blade arm being pivotally coupled to said hub eccentrically of said shaft.

15. The apparatus set forth in claim 14 wherein said motor system includes a servo motor and a gear reducer coupling said servo motor to said output shaft.

16. The apparatus set forth in claim 10 wherein said knife blade has a cutting edge at an outward angle to said blade arm.

* * * * *